United States Patent [19]

Akatsu et al.

[11] Patent Number: 4,888,696
[45] Date of Patent: Dec. 19, 1989

[54] ACTIVELY CONTROLLED AUTOMOTIVE SUSPENSION SYSTEM WITH ACCELERATION AND ANGULAR-VELOCITY DEPENDENT ANTI-PITCHING AND/OR ANTI-ROLLING FEATURE

[75] Inventors: Yohsuke Akatsu, Yokohama; Naoto Fukushima, Kamakura; Yukio Fukunaga, Zushi; Sunao Hano, Yokohama; Masaharu Satoh, Kanagawa, all of Japan

[73] Assignee: Nissan Motor Company, Limited, Yokohama, Japan

[21] Appl. No.: 176,246

[22] Filed: Mar. 31, 1988

[30] Foreign Application Priority Data

Mar. 31, 1987 [JP] Japan .................................. 62-78323

[51] Int. Cl.⁴ ............................................ B60G 21/06
[52] U.S. Cl. ............................... 364/424.05; 280/707
[58] Field of Search ................... 364/424.05; 280/6 R, 280/6 H, DIG. 1, 689, 707

[56] References Cited

U.S. PATENT DOCUMENTS

| | | | |
|---|---|---|---|
| 4,605,244 | 8/1986 | Tanaka et al. | 280/DIG. 1 |
| 4,669,749 | 6/1987 | Tanaka et al. | 280/707 |
| 4,691,284 | 9/1987 | Izumi et al. | 280/707 |
| 4,693,493 | 9/1987 | Ikemoto et al. | 280/689 |
| 4,697,237 | 9/1987 | Tanaka et al. | 280/6 H |
| 4,702,490 | 10/1987 | Yamaguchi et al. | 280/707 |
| 4,741,554 | 5/1988 | Okamoto | 280/707 |
| 4,749,210 | 6/1988 | Sugasawa | 280/707 |

Primary Examiner—Gary Chin
Attorney, Agent, or Firm—Foley & Lardner, Schwartz, Jeffery, Schwaab, Mack, Blumenthal & Evans

[57] ABSTRACT

An actively controlled automotive suspension system employs a factor representative of self-induced attitude change creative factor as a correction factor in attitude regulating suspension control. Suspension characteristics is controlled on the basis of rolling and/or pitching energy representing parameter. The correction factor representative of self-induced attitude change is derived on the basis of vehicular attitude change velocity for canceling the self-induced rolling and/or pitching. By canceling the self-induced rolling and/or pitching creative component from the rolling and/or pitching acceleration factor, higher rolling and/or pitching response characteristics can be provided so as to satisfactory high driving stability and riding comfort.

23 Claims, 7 Drawing Sheets

ACTIVELY CONTROLLED AUTOMOTIVE SUSPENSION SYSTEM WITH ACCELERATION AND ANGULAR VELOCITY DEPENDENT ANTI-PITCHING AND/OR ANTI-ROLLING FEATURE

BACKGROUND OF THE INVENTION

1. Field of the Invention

The present invention relates generally to an automotive suspension system having adjustable suspension characteristics depending upon vehicle driving condition. More specifically, the invention relates to an actively controlled automotive suspension system which varies suspension characteristics in a positive manner for suppressing attitude change of the vehicle. Further particularly, the invention relates to an anti-rolling and/or anti-pitching suspension control which can avoid self-induced vibration which may otherwise occur.

2. Description of the Background Art

The U.S. Pat. No. 4,702,490, issued on Oct. 27, 1987, to Hirotsugu YAMAGUCHI et al., and assigned to the common assignee to the present invention, discloses an actively or positively controlled automotive suspension system which includes hydraulic cylinder for generating variable damping force against relative motion of a vehicular suspension member and a vehicle body in bounding and rebounding directions for adjusting suspension characteristics and adjusting vehicle body attitude.

Similar types of actively controlled suspension systems have been disclosed in the co-pending U.S. patent application Ser. No. 060,911, filed on June 12, 1987 and assigned to the common assignee to the present invention. Further systems are described in European Patent First Publications Nos. 02 49 246 and 02 49 209 respectively corresponding to co-pending U.S. patent applications Ser. Nos. 061,368 (filed on June 15, 1987) and 059,888, filed on June 9, 1987, both of which have been assigned to the common assignee to the present invention. The later-mentioned three inventions includes features of anti-rolling and/or anti-pitching suspension control for adjusting damping characteristics at respective vehicular wheels for suppressing vehicular rolling motion.

Though such prior proposed actively controlled suspension systems are successful in suppressing rolling motion and/or pitching motion caused in the vehicle body, at a certain level, a problem can be encountered in generating self-induced vehicular body vibration in rolling and/or pitching directions. Namely, in the actively controlled suspension system, suspension characteristics are controlled depending upon the vehicle driving parameters which are representative of vehicular rolling and/or pitching motions. When the vehicle attitude changes in rolling or pitching directions, the inertial moment generated in the vehicle body by the rolling or pitching motion tends to be included in the rolling and/or pitching magnitude indicative parameter. This causes over-shooting to generate self-induced vibration. The self-induced vibration may degrade riding comfort and drivability of the vehicle.

SUMMARY OF THE INVENTION

Therefore, it is an object of the invention to provide an actively controlled suspension system of an automotive vehicle, which can prevent the suspension system from causing self-induced vibration.

In order to accomplish the afore-mentioned and other objects, an actively controlled automotive suspension system, according to the present invention, employs a factor representative of self-induced attitude change creative factor as a correction factor in attitude regulating suspension control. Suspension characteristics is controlled on the basis of a rolling and/or pitching energy representing parameter. The correction factor representative of self-induced attitude change is derived on the basis of vehicular attitude change velocity for canceling the self-induced rolling and/or pitching. By canceling the self-induced rolling and/or pitching creative component from the rolling and/or pitching acceleration factor, higher rolling and/or pitching response characteristics can be provided so as to satisfactory obtain high driving stability and riding comfort.

According to one aspect of the invention, a control system for an automotive suspension system for controlling vehicular attitude comprises a suspension system disposed between a vehicle body and a suspension member which rotatably supports a vehicular wheel, the suspension system having a variable pressure chamber filled with a working fluid of controlled pressure, a pressure adjusting means, associated with the variable pressure chamber, for adjusting the pressure of the working fluid in the pressure chamber, a first sensor means monitoring acceleration in vehicular attitude change to produce a first sensor means signal indicative of the attitude change acceleration, a second sensor means monitoring self-induced attitude change creative component which is to be contained in the first sensor means signal, to produce a second sensor means signal indicative thereof, and a control unit receiving the first and second sensor means signals, deriving suspension control signal value on the basis of the first sensor means signal and modifying the suspension control signal value on the basis of the second sensor means signal, the control unit outputting a control signal to control the pressure adjusting means for adjusting suspension characteristics to suppress vehicular attitude change.

According to another aspect of the invention, an anti-rolling suspension control system for an automotive suspension system for controlling vehicular attitude comprises a suspension system disposed between a vehicle body and a suspension member which rotatably supports a vehicular wheel, the suspension system having a variable pressure chamber filled with a working fluid of controlled pressure, a pressure adjusting means, associated with the variable pressure chamber, for adjusting the pressure of the working fluid in the pressure chamber, a first sensor means monitoring acceleration in vehicular rolling to produce a first sensor means signal indicative of the attitude change acceleration, a second sensor means monitoring self-induced rolling creative component which is to be contained in the first sensor means signal, to produce a second sensor means signal indicative thereof, and a control unit receiving the first and second sensor means signals, deriving suspension control signal value on the basis of the first sensor means signal and modifying the suspension control signal value on the basis of the second sensor means signal, the control unit outputting a control signal to control the pressure adjusting means for adjusting suspension characteristics to suppress vehicular rolling.

According to a further aspect of the invention, an anti-pitching suspension control system for an automotive suspension system for controlling vehicular attitude comprises a suspension system disposed between a vehicle body and a suspension member which rotatably supports a vehicular wheel, the suspension system having a variable pressure chamber filled with a working fluid of controlled pressure, a pressure adjusting means, associated with the variable pressure chamber, for adjusting the pressure of the working fluid in the pressure chamber, a first sensor means monitoring acceleration in vehicular pitching to produce a first sensor means signal indicative of the attitude change acceleration, a second sensor means monitoring self-induced pitching creative component which is to be contained in the first sensor means signal, to produce a second sensor means signal indicative thereof, and a control unit receiving the first and second sensor means signals, deriving suspension control signal value on the basis of the first sensor means signal and modifying the suspension control signal value on the basis of the second sensor means signal, the control unit outputting a control signal to control the pressure adjusting means for adjusting suspension characteristics to suppress vehicular pitching.

The second sensor means monitors velocity of pitching for deriving the self-induced pitching creative component based thereon. On the other hand, the first sensor means includes means for determining response characteristics of suspension control in response to pitching acceleration and the second sensor means includes means for determining response characteristics of suspension control in response to the self-induced pitching creative component.

Each of the response characteristics determining means of the first and second may comprise an amplifier provided with a given gain which determines response characteristics.

DESCRIPTION OF THE PREFERRED EMBODIMENT

Figure 1:
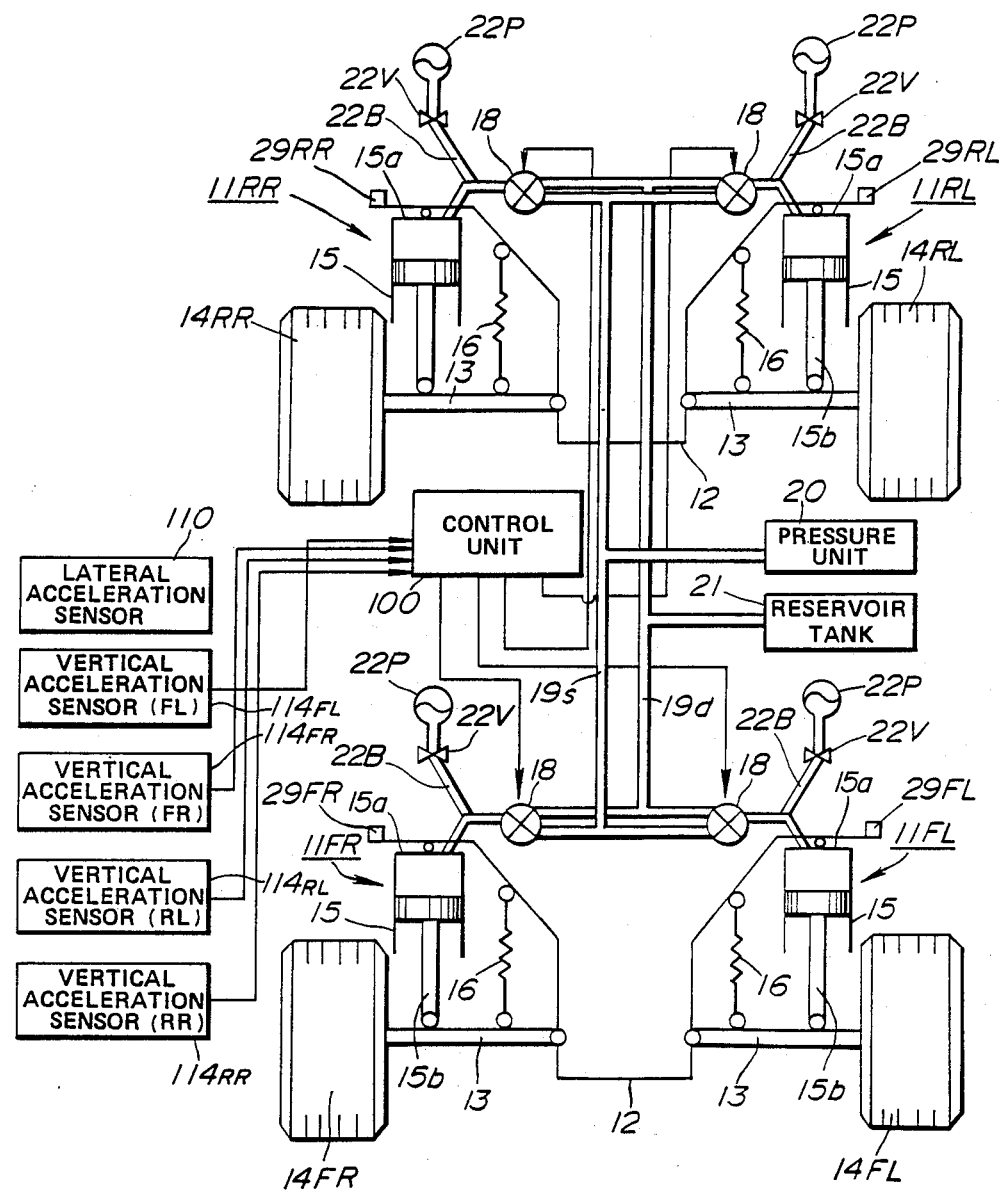
FIG. 1 is a schematic illustration of general construction of an actively controlled suspension system.

Referring now to the drawing, particularly to FIG. 1, a vehicle has four suspension systems 11FL, 11FR, 11RL and 11RR for respectively suspending vehicle body 12 on front-left, front-right, rear-left and rear-right road wheels 14FL, 14FR, 14RL and 14RR. Each of the front-left, front-right, rear-left and rear-right suspension systems 11FL, 11FR, 11RL and 11RR comprises a suspension member 13, such as a suspension link, a suspension arm and so forth, and a suspension assembly 15 which is interposed between the vehicle body 12 and the suspension member 13. The suspension assembly 15 has a hydraulic cylinder 15A which serves as an actuator for generating damping force against bounding and rebounding motion between the vehicle body and the suspension member, and a coil spring 16.

It should be appreciated that, in the shown embodiment, the coil spring 16 is not necessary to damp dynamic kinematic energy and should resiliently support only static load to be exerted between the vehicle body and the suspension member. However, it should be, of course, possible to employ the coil spring which can be strong enough to damp part of dynamic kinematic energy in relative bounding and rebounding motion of the vehicle body and the suspension member.

The hydraulic cylinder 15A has a hollow cylinder housing 15a filled with a viscous working fluid and a piston 15c sealingly and thrustingly disposed within the internal space of the cylinder housing to divide the cylinder space into upper and lower fluid chambers 15d and 15e. A piston rod 15b extends through one end of the cylinder housing 15a. The other end of the cylinder housing 15a is connected to one of the vehicle body 12 and the suspension member 13. On the other hand, the end of the piston rod 15b is connected to the other of the vehicle body 12 and the suspension member 13.

The hydraulic cylinder 15A of the suspension assembly 15 is connected to a hydraulic pressure source unit 20 via a hydraulic circuit which includes pressure control valve 18. The pressure control valve 18 is electrically operable and connected to a microprocessor-based control unit 100. The hydraulic circuit 19 includes a supply line 19s and a drain line 19d. The pressure source unit generally comprises a pressure unit 20 and a reservoir tank 21. The pressure unit 20 is connected to the reservoir tank 21 to suck the viscous working fluid in the reservoir tank 21 to feed to the pressure control valve 18 via the supply line 19s. On the other hand, the drain line 19d is connected to the reservoir 21 to return the working fluid thereto.

As seen from FIG. 1, a pressure accumulators 22P are communicated the upper fluid chamber 15d of the hydraulic cylinder 15A via a pressure line 22B. A throttle valve 22V is inserted between the upper fluid chamber 15d and the pressure accumulator 22P. In the shown embodiment, the throttle valve 22V has a fixed throttling rate.

Figure 2:
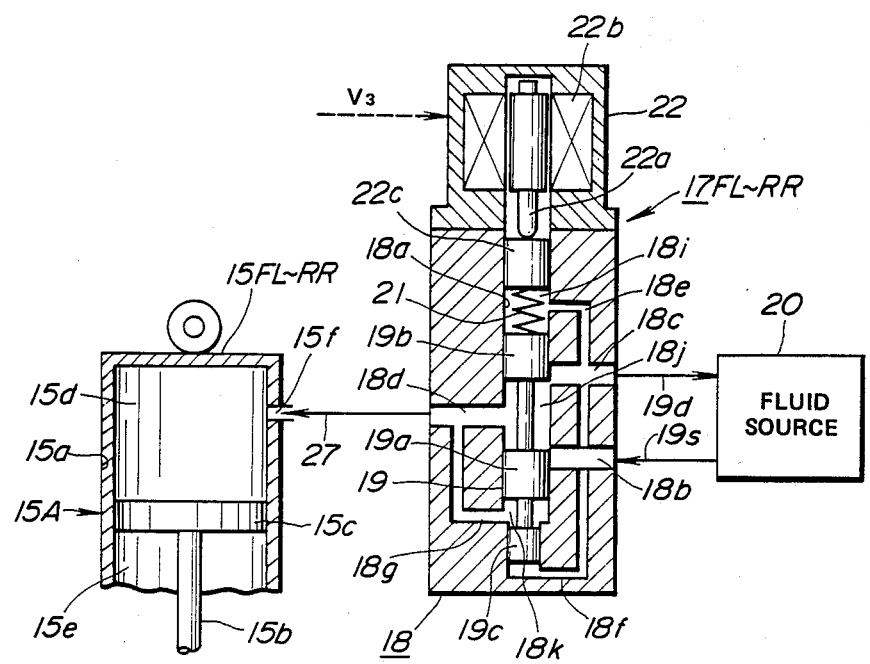
FIG. 2 is a sectional view of a pressure control valve assembly to be employed in the preferred embodiment of the actively controlled suspension system according to the invention.

FIG. 2 shows the detailed construction of the hydraulic cylinder 15A and the pressure control valve 18. As will be seen from FIG. 2, the hollow cylinder housing 15a is formed with a port 15f communicating the upper fluid chamber 15d to an outlet port 18d of the pressure control valve 18 via a communication line 27. Though FIG. 2 does not show clear construction, the lower fluid chamber 15e is defined as an enclosed space and is filled with the viscous working fluid. The pressure of the working fluid in the lower fluid chamber 15e at an initial position of the piston 15c serves as a reference pressure and per se serves as resistance for downward movement of the piston.

The pressure control valve 18 has a valve housing 18A having the aforementioned outlet port 18d, an inlet port 18b and a drain port 18c. Respective inlet port 18b, the drain port 18c and the outlet port 18d are connected to a valve bore 18a defined within the valve housing 18A. A valve spool 19 is disposed within the valve bore 18a for thrusting movement therein. The valve spool 19 has first, second and third lands 19a, 19b and 19c. As will be seen from FIG. 2, the third land 19c has smaller diameter than that of the first and second lands 19a and 19b. The third land 19c defines a fifth pressure control chamber 18h which is connected to the drain port 18c via a drain path 18f. An actuator piston 22c is also disposed within the valve bore 18a. The actuator piston 22c opposes the second land 19b in spaced apart relationship to define a second pressure control chamber 18i which is connected to the drain port 18c via a drain path 18e. An annular pressure chamber 18j is defined between the first and second lands 19a and 19b. The pressure chamber 18j is constantly communicated with the outlet port 18d and whereby communicated with the upper fluid chamber 15d. On the other hand, the pressure chamber 18j shifts according to shifting of the valve spool 19 to selectively communicate with the inlet port 18b and the drain port 18c. On the other hand, an pressure control chamber 18k is defined between the first and third lands 19a and 19c. The pressure control chamber 18k is in communication with the outlet port 18d via a pilot path 18g. A bias spring 22d is interposed between the actuator piston 22c and the valve spool 19. The actuator piston 22c contacts with an actuator rod 22a of an electrically operable actuator 22 which comprises an electromagnetic solenoid. The solenoid 22 comprises a proportioning solenoid.

Figure 3:
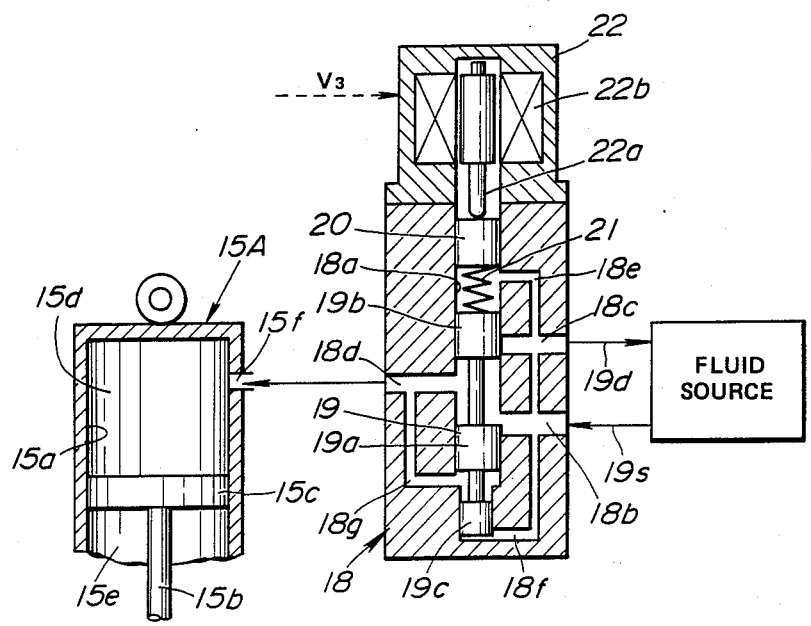
FIGS. 3(a) and 3(b) are sectional view similar to FIG. 2, but showing the condition where a piston in the pressure control valve assembly is shifted downwardly for reducing fluid pressure in a fluid chamber of a hydraulic cylinder in the suspension system and upwardly to increase the fluid pressure in the fluid chamber.
Figure 3:
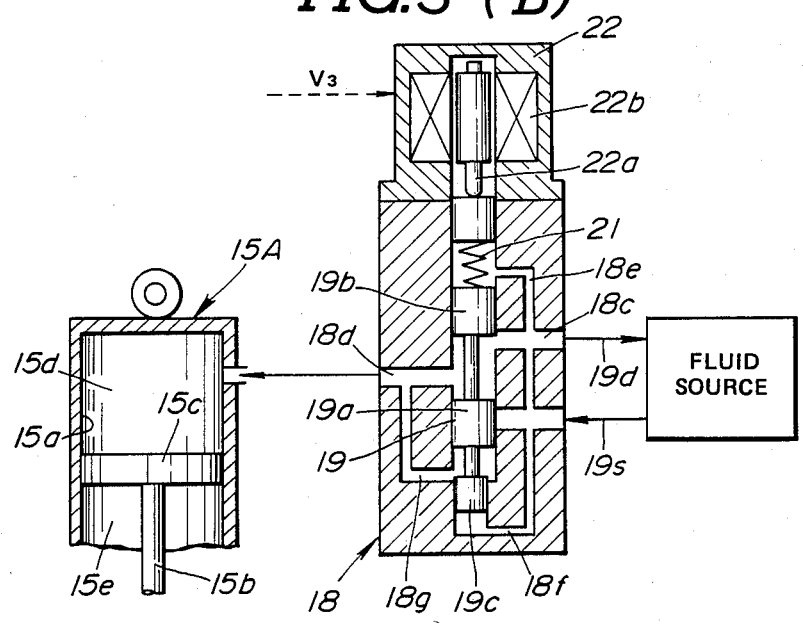

In order to increase the supply pressure of the working fluid, the spool valve 19 is shifted to the position shown in FIG. 3(A) to increase path area at a throttle constituted at the inner end of the inlet port 18b by means of the land 19a of the spool valve 19. On the other hand, in order to decrease the supply pressure of the working fluid, the spool valve is shifted to the position shown in FIG. 3(B) to decrease the path area at the throttle of the inner end of the inlet port 18b and opens the drain port 18 which is normally blocked by means of the land 19b of the spool valve.

Construction of the pressure control valves should not be specified to the construction as illustrated in FIGS. 2, 3(A) and 3(B) but can be replaced with any appropriate constructions. For example, the pressure control valve constructions as illustrated in European Patent First Publication No. 01 93 124, set forth above, can also be employed. The disclosure of the aforementioned European Patent First Publication No. 01 93 124 is herein incorporated by reference for the sake of disclosure.

Figure 4:
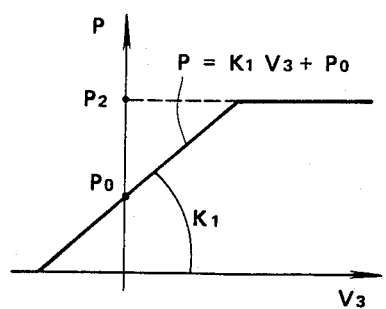
FIG. 4 is a graph showing variation of the fluid pressure in a hydraulic cylinder as controlled by the pressure control valve assembly of FIG. 2.

As seen from FIG. 2, the proportioning solenoid 22 comprises the actuator rod 22a and a solenoid coil 22b. The solenoid coil 22b is energized by suspension control signal $V_3$ from the controller 100. In the shown embodiment of the pressure control valve, the working fluid pressure P at the outlet port 18d is variable according to the characteristics shown in FIG. 4. Namely, when the control valve $V_3$ as represented by the suspension control signal is zero, the pressure P at the outlet port 18 becomes $P_0$ determined according to a predetermined offset pressure $P_0$. When the suspension control signal value in positive value increases, the fluid pressure P at the outlet port 18d increases with a predetermined proportioning gain $K_1$. Namely, by increasing of the suspension control $V_3$, the actuator rod 22a is driven downwardly in FIG. 2 at a magnitude toward to position of FIG. 3(A) to achieve increasing of the fluid pressure with the predetermined proportioning gain $K_1$. The fluid pressure P at the outlet port 18d saturate at the output pressure $P_2$ of the pressure unit 20. On the other hand, when the suspension control signal value $V_3$ decreases, the pressure P decreases to zero to by shifting of the actuator rod 22a toward the direction to FIG. 3(B).

The actuator rod 22a of the proportioning solenoid 22 is associated with the actuator piston 22c. Contact between the actuation rod 22a and the actuator piston 22c can be maintained by the resilient force of the bias spring 22d which normally biases the actuator piston toward the actuation rod. On the other hand, the spring force of the bias spring 22d is also exerted on the valve spool 19 to constantly bias the valve spool downwardly in FIG. 2. The valve spool 19 also receives upward hydraulic force from the pressure control chamber 18k. Therefore, the valve spool 19 is oriented at the position in the valve bore at the position where the downward bias of the bias spring 22d balances with the upward hydraulic force of the pressure control chamber 18k.

When bounding motion occurs at the suspension member, the piston 15c of the hydraulic cylinder 15A shifts upwardly to cause increasing of the fluid pressure in the upper chamber 15d. This causes increasing of the fluid pressure at the outlet port 18d of the pressure control valve 18. As a result, the fluid pressure in the pressure control chamber 18k increases by the pressure introduced through the pilot path 18g to destroy the balance between the downward bias of the bias spring 22d and the upward hydraulic force of the pressure control chamber 18k. This causes upward movement of the valve spool 19 against the spring force of the bias spring 22d, as shown in FIG. 3(B). As a result, path area of the drain port 18c increases and the inlet port 18b becomes being blocked. Therefore, the fluid pressure in the fluid chamber 15d is drained through the drain port. Therefore, the increased fluid pressure in the fluid chamber 15d of the hydraulic cylinder 15A can be successfully absorbed so that the bounding energy input from the suspension member will not be transmitted to the vehicle body.

When rebounding motion occurs at the suspension member, the piston 15c of the hydraulic cylinder 15A shifts downwardly to cause decreasing of the fluid pressure in the upper chamber 15d. This causes decreasing of the fluid pressure at the outlet port 18d of the pressure control valve 18. As a result, the fluid pressure in the pressure control chamber 18k decreases by the pressure introduced through the pilot path 18g to destroy the balance between the downward bias of the bias spring 22d and the upward hydraulic force of the pressure control chamber 18k. This causes downward movement of the valve spool 19 against the spring force of the bias spring 22d, as shown in FIG. 3(A). As a result, path area of the inlet port 18b increases and the drain port 18c becomes being blocked. Therefore, fluid pressure in the fluid chamber 15d is increased by the pressure introduced through the inlet port. Therefore, the decreased fluid pressure in the fluid chamber 15d of the hydraulic cylinder 15A can be successfully absorbed so that the rebounding energy input from the suspension member will not be transmitted to the vehicle body.

Here, since no flow resisting element, such as orifice, throttling valve, is disposed between the fluid reservoir 21 and the port 18c, no damping force against the upward motion of the piston 15c in the hydraulic cylinder 15A will be produced in response to the bounding motion of the suspension member. Since the damping force exerted on the piston 15c may serves to allow transmission of the part of bounding energy to the vehicle body to cause rough ride feeling, the shown embodiment of the suspension system may provide satisfactorily high level riding comfort by completely absorbing the bounding and rebounding energy set forth above.

Figure 5:
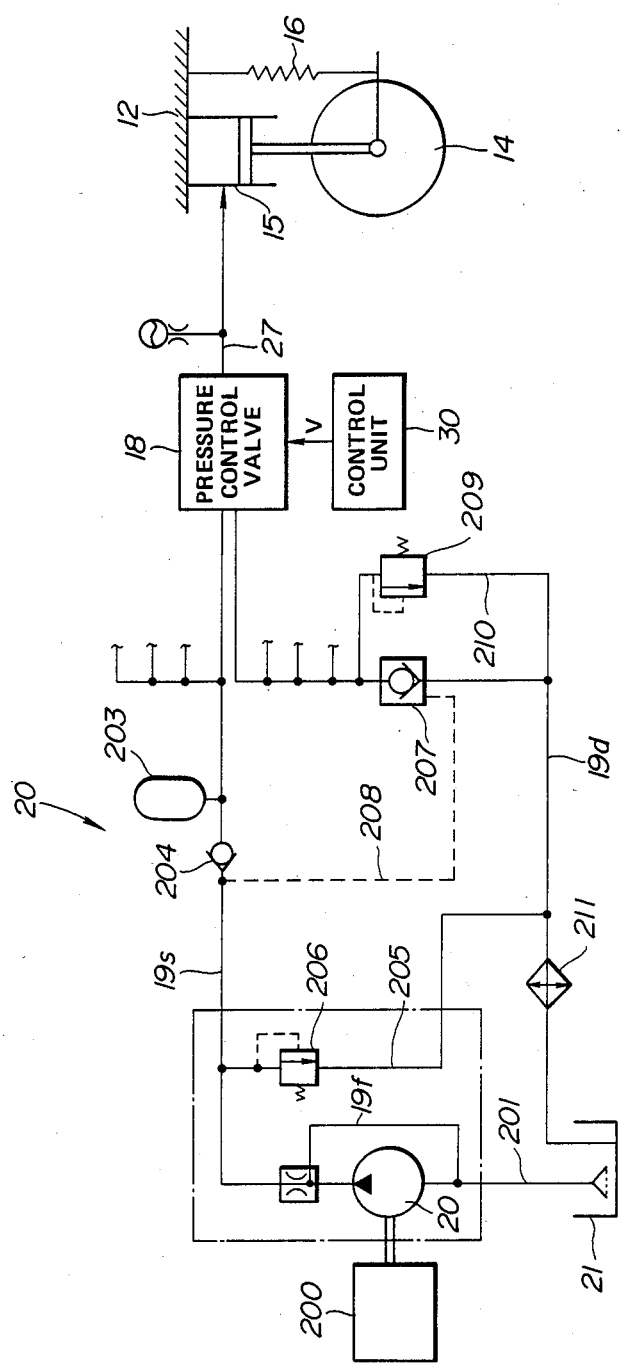
FIG. 5 is a schematical and diagramatical illustration of a hydraulic circuit to be employed for the preferred embodiment of the line pressure control of the invention.

FIG. 5 shows detailed circuit construction of the preferred embodiment of the pressure source unit to be employed in the suspension control system according to the invention. As set forth, the pressure source unit includes the pressure unit 20 which comprises a fluid pump, and is connected to the reservoir 21 via a suction pipe 201 which is driven by means of an automotive engine 200. The outlet of the pressure unit 20, through which the pressurized working fluid is fed, is connected to the inlet port 18b of the pressure control valve 18 via the supply line 19s. A pressure regulating orifice 202 is disposed in the supply line 19s for suppressing pulsatile flow of the working fluid and whereby regulate the output pressure of the pressure unit 20 to be delivered to the pressure control valve 18. A feedback line 19f is connected to the upstream of the pressure regulating orifice 202 at one end. The other end of the feedback line 19f is connected to the upstream of the inlet of the pressure unit 20. Therefore, excessive fluid between the pressure unit 20 and the orifice 202 is fed back to the inlet side of the pressure unit.

A pressure accumulator 203 is also connected to the supply line 19s to receive therefrom the pressurized fluid for accumulating the pressure. An one-way check valve 204 is disposed in the supply line 19s at the position upstream of the junction between the pressure accumulator 203 and the supply line 19.

A pressure relief line 203 is also connected to the supply line 19s at the position intermediate between the pressure regulating orifice 202 and the one-way check valve 204, at one end. The other end of the pressure relief line 205 is connected to the drain line 19d. A pressure relief valve 206 is disposed in the pressure relief line 205. The pressure relief valve 206 is responsive to the fluid pressure in the supply line 19s higher than a give value to drain part of the working fluid to the drain line for maintaining the pressure in the supply line 19s below the given pressure value.

On the other hand, a shut-off valve 207 is disposed in the drain line 19d. The shut-off valve 207 is also connected to the supply line 19s at upstream of the one-way check valve 204 to receive therefrom the pressure in the supply line as a pilot pressure, via pilot line 208. The shut-off valve 207 is designed to be maintained at open position as long as the pilot pressure to be introduced through the pilot line 208 is held at a pressure level higher than or equal to a given pressure level. At the open position, the shut-off valve maintains fluid communication between the inlet side and outlet side thereof so that the working fluid in the drain line 19d may flow therethrough to the reservoir tank 21. On the other hand, the shut-off valve 207 is responsive to the pilot pressure drops below the given pressure level to be switched into shut-off position. At the shut-off position, the shut-off valve blocks fluid communication between the drain port 18c and the reservoir tank 21.

In parallel relationship to the shut-off valve, a pressure relief valve 209 is provided. The pressure relief valve 209 is disposed in a by-pass line 210 connecting the upstream side and downstream side of the shut-off valve 207. The pressure relief valve 209 is normally held at closed position to block fluid communication therethrough. On the other hand, the pressure relief valve 209 is responsive to a fluid pressure in the drain line 19d upstream thereof, higher than a set pressure, e.g. 30 kgf/cm, in order to establish fluid communication between the upstream side and downstream side of the shut-off valve to allow the excessive pressure at the upstream side drain line 19d to be drained therethrough. Therefore, the pressure relief valve 209 limits the maximum pressure at the set pressure. The set pressure of the pressure relief valve 209 corresponds to a predetermined offset pressure.

An oil cooler 211 is disposed in the drain line 19d for cooling the working fluid returning to the reservoir tank 21.

Pressurized fluid supply operation to be taken place by the pressure source unit as set forth above will be discussed herebelow.

While the automotive engine 200 is running, the fluid pump as the pressure unit 20 is driven. Therefore, the working fluid in the reservoir tank 21 is sucked via the suction pipe 201 and pressurized through the pressure unit 20. The pressurized working fluid is discharged from the outlet of the pressure unit 20 and fed to the pressure control valve 18 via the supply line 19s including the pressure regulating orifice 202 and the one-way check valve 204. When the pressure control valve 18 in a position of FIG. 3(A), the pressurized working fluid passes the pressure control valve and introduced into the upper fluid chamber 15d of the hydraulic cylinder 15. On the other hand, when the pressure control valve 18 is in the position of FIG. 3(B) to block communication between the supply line 19s and the upper fluid chamber 15d, the line pressure in the supply line increases. When the line pressure in the supply line 19s becomes higher than a set pressure of the pressure relief valve 206 in the pressure relief line 205, the excessive pressure higher than the set pressure is fed to the drain line 19d via the pressure relief valve 206 and thus returned to the reservoir tank 21.

The fluid pressure in the supply line 19s is also fed to the shut-off valve 207 via the pilot line 208. As set forth, the shut-off valve 207 is placed at open position as long as the pilot pressure introduced through the pilot line 208 is held higher than or equal to the set pressure thereof. Therefore, fluid communication between the pressure control valve 18 and the reservoir tank 21 is maintained. When the pressure control valve 18 is in the position of FIG. 3(B), the working fluid is thus returned to the reservoir tank 21 via the drain line 19d via the shut-off valve 207 and the oil cooler 211.

Since the shut-off valve 207, even at the open position, serves as a resistance to the fluid flow. Therefore, the fluid pressure in the drain line 19d upstream of the shut-off valve 207 becomes excessively higher, i.e. higher than the off-set pressure $P_0$. Then, the pressure relief valve 209 becomes active to open for allowing the excessive pressure of the working fluid to flow through the by-pass line 210.

When the engine 200 stops, the pressure unit 20 cease operation. By stopping of the pressure unit 20, the working fluid pressure in the supply line 19s drops. According to drop of the pressure in the supply line 19s, the pilot pressure to be exerted to the shut-off valve 207 via the pilot line 208 drops. When the pilot line 208 drops below or equal to the set pressure, the shut-off valve 207 is switched into shut-off position to block fluid communication therethrough. As a result, the fluid pressure in the drain line 19d upstream of the shut-off valve 207 becomes equal to the pressure in the upper fluid chamber 15d. Therefore, even when the working fluid leaks through a gap between the spool valve 19 and the inner periphery of the valve bore 18a, it will not affect the fluid pressure in the upper fluid chamber 15d.

This is advantageous to maintain the suspension characteristics of the suspension systems irrespective of the engine driving condition.

Figure 6:
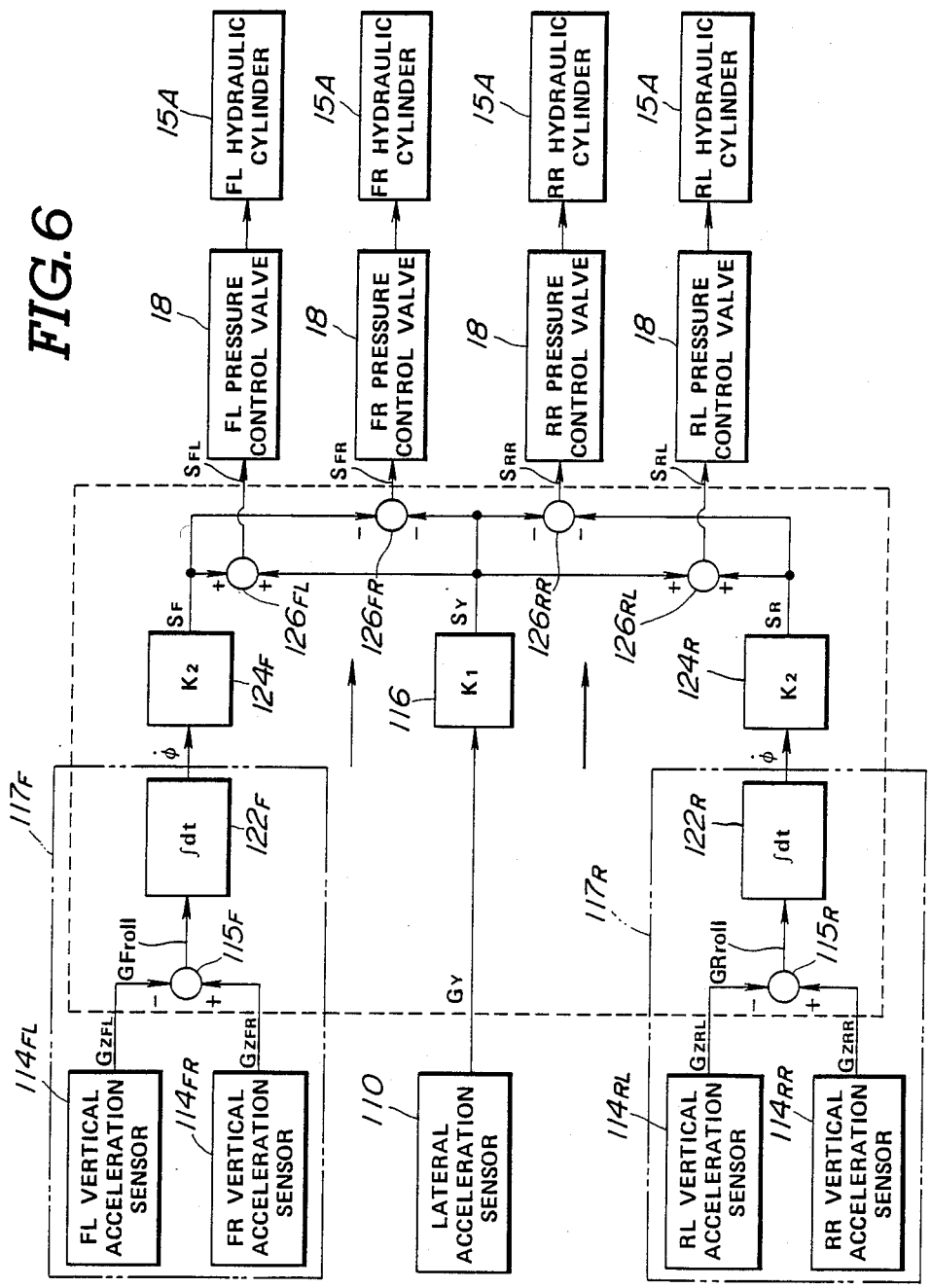
FIG. 6 is a schematic block diagram of the preferred embodiment of suspension control system of FIG. 1.

In order to perform control for adjusting suspension characteristics depending upon the vehicle driving condition, the microprocessor-based control unit 100 is provided. The suspension control system including the control unit 100 is illustrated in FIG. 6. The control unit 100, illustrated in FIG. 6, includes a microprocessor 101 which comprises an arithmetic circuit 102, a memory 104 and input/output unit 106. A lateral acceleration sensor 110 is also provided for monitoring lateral acceleration to be exerted on the vehicle to produce a lateral acceleration indicative signal Gy. Vertical acceleration sensors 114FL, 114FR, 114RL and 114RR are provided for monitoring vertical acceleration at respective front-left, front-right, rear-left and rear-right suspension systems 11FL, 11FR, 11RL and 11RR to produce vertical acceleration indicative signals. Hereafter, the acceleration sensor 114FL monitoring vertical acceleration at the front-left suspension system 11FL will be referred to as "FL vertical acceleration sensor". Similarly, the acceleration sensor 114FR monitoring vertical acceleration at the front-right suspension system 11FR will be referred to as "FR vertical acceleration sensor"; the acceleration sensor 114RL monitoring vertical acceleration at the rear-left suspension system 11RL will be referred to as "RL vertical acceleration sensor"; and the acceleration sensor 114RR monitoring vertical acceleration at the rear-right suspension system 11RR will be referred to as "RR vertical acceleration sensor". The vertical acceleration indicative signals produced by respective FL, FR, RL and RR vertical acceleration sensors 114FL, 114FR, 114RL and 114RR will be hereafter referred to respectively as "FL vertical acceleration indicative signal $Gz_{FL}$", "FR vertical acceleration indicative signal $Gz_{FR}$", "RL vertical acceleration indicative signal $Gz_{RL}$" and "RR vertical acceleration indicative signal $Gz_{RR}$".

The vertical acceleration sensors 114FL, 114FR, 114RL and 114RR may, in practice, comprise a strain gauge or piezoelectric sensor mounted at the top end portion of the suspension struts at respective front-left, front-right, rear-left and rear-right wheels. The practical construction of the vertical acceleration sensor has been disclosed in the co-pending U.S. patent application Ser. No. 120,964, filed on Nov. 16, 1987. The disclosure of the above-identified U.S. patent application Ser. No. 120,964 is herein incorporated by reference for the sake of disclosure.

The vertical acceleration sensors 114FL and 114FR are connected to an rolling acceleration deriving circuit 115F. As seen from FIG. 6, the vertical acceleration sensor 114FL is connected to the inverting input terminal of the rolling angle acceleration circuit 115F. On the other hand, the vertical acceleration sensor 114FR is connected to the non-inverting input terminal of the rolling acceleration deriving circuit 115F. Since the polarity of the FL vertical acceleration indicative signal $Gz_{FL}$ and $Gz_{FR}$ input to the rolling angle acceleration deriving circuit 115F are different from each other, the difference value obtained in the rolling angle acceleration circuit 115F represents the height difference at the front-left and front-right suspension systems. The front rolling acceleration deriving circuit 115F derives a rolling acceleration indicative value $GF_{roll}$ which has an absolute value being representative of the magnitude of rolling and the polarity represents the direction of rolling. On the other hand, the rolling acceleration indicative value $GF_{roll}$ has a polarity of the value representative of the direction of the rolling. Based on the obtained difference value, the rolling angle acceleration deriving circuit 115F outputs a rolling acceleration signal representative of rolling magnitude and rolling direction at the front-left and front-right suspension systems, which adder signal will be hereafter referred to as "front rolling acceleration indicative signal $GF_{roll}$". The front rolling acceleration indicative signal $GF_{roll}$ is fed to an integrator 122F. The integrator 122F integrates the front rolling acceleration indicative signal $GF_{roll}$ to derive vehicular rolling velocity $\phi_F$ at the front position of the vehicle, where front-left and front-right suspension systems are provided. On the other hand, the vertical acceleration sensors 114RL and 114RR are connected to an rolling acceleration deriving circuit 115R. As seen from FIG. 6, the rolling acceleration deriving circuit 115R has an inverting input terminal connected to the vertical acceleration sensor 114RL and a non-inverting input terminal connected to the vertical acceleration sensor 114RR. Therefore, the rolling acceleration deriving circuit 115R operates in the same manner as that of the rolling acceleration deriving circuit 115F to derive a difference value representative of the rolling magnitude and rolling direction in the rear suspension systems. The rolling acceleration deriving circuit 115R is connected to an integrator 122R to output a rolling acceleration indicative signal $GR_{roll}$ representative of rolling magnitude and the rolling direction at the rear-left and rear-right suspension systems, which rolling acceleration indicative signal will be hereafter referred to as "rear rolling acceleration indicative signal $GR_{roll}$". The integrator 122R integrates the rear rolling acceleration indicative signal $GR_{roll}$ to derive vehicular rolling velocity $\phi_R$ at the rear position of the vehicle, where rear-left and rear-right suspension systems are provided. The rolling angle $\phi_F$ at the front suspension systems will be hereafter referred to as "front rolling angle" and the rolling angle $\phi_R$ at the rear suspension systems will be hereafter referred to as "rear rolling angle".

The FL and FR vertical acceleration sensors 114FL and 114FR, the rolling acceleration deriving circuit 115F and the integrator 122F forms a circuit 117F for projecting the front rolling velocity $\phi_F$. Similarly, the RL and RR vertical acceleration sensors 114RL and 114RR, the rolling acceleration deriving circuit 115R and the integrator 122R forms a circuit 117R for projecting the rear rolling velocity $\phi_F$.

The integrators 122F is connected to an amplifier 124F. The amplifier 124F is provided a fixed amplifier gain $K_2$. The amplifier 124F amplifies the front rolling velocity indicative signal $\phi_F$ by the gain $K_2$ to output a projected rolling velocity dependent front suspension control signal $S_F$. The front suspension control signal $S_F$ is fed to one input terminals of adders 126FL and 126FR.

The integrators 122R is connected to an amplifier 124R. The amplifier 124R is provided a fixed amplifier gain $K_2$. The amplifier 124R amplifies the rear rolling velocity indicative signal $\phi_R$ by the gain $K_2$ to output a rolling velocity dependent rear suspension control signal $S_R$. The rear suspension control signal $S_R$ is fed to one input terminals of adders 126RL and 126RR.

The lateral acceleration sensor 110 is connected to an amplifier 116. The amplifier 116 is provided an amplifier gain $K_1$. The amplifier 116 receives the lateral acceleration indicative signal Gy of the lateral acceleration sensor 110 to amplify the received signal by the gain $K_1$ to derive a lateral acceleration dependent suspension control signal Sy. The suspension control signal Sy is fed to the adders 126FL, 126FR, 126RL and 126RR. Namely, the suspension control signal Sy is input to the other input terminals of the adders 126FL and 126RR and to the other inverting input terminals of the adder 126FR and 126RL.

As will be seen from the above, the adders 126FL, 126RR and 126FR, 126RL derives sum values of mutually different polarity to generate control signals $S_{FL}$, $S_{RR}$ and $S_{FR}$, $S_{RL}$ for respectively corresponding pressure control valves in opposite bounding and rebounding directions.

The control signals output from the adder 126FL will be hereafter referred to as "FL control signal $S_{FL}$"; the control signals output from the adder 126FR will be hereafter referred to as "FR control signal $S_{FR}$"; the control signals output from the adder 126RL will be hereafter referred to as "RL control signal $S_{RL}$"; the control signals output from the adder 126RR will be hereafter referred to as "RR control signal $S_{RR}$".

Assuming that the vehicle is running in straight on a substantially smooth road, rolling motion on the vehicle body will not occur. Therefore, no substantially change in relative distance between the vehicle body and the suspension members at respective front-left, front-right, rear-left and rear-right suspension systems will occur. As a result, the all of the vertical acceleration indicative signals $Gz_{FL}$, $Gz_{FR}$, $Gz_{RL}$ and $Gz_{RR}$ of the vertical acceleration sensors 114FL, 114FR, 114RL and 114RR and the lateral acceleration indicative signal Gy of the lateral acceleration sensor 110 are held at substantially zero. Therefore, all of the suspension control signals $S_{FL}$, $S_{FR}$, $S_{RL}$ and $S_{RR}$ are held substantially zero. Therefore, the output fluid pressure of respectively pressure control valves 18 is held at offset pressure $P_0$. This output fluid pressure of the pressure control valves 18 is introduced in the upper fluid chamber 15d of the hydraulic cylinder 15A to locate the pistons at initially set positions. By this the strokes of respective hydraulic cylinders 15A are held at initial value.

At this position, the road shock due to small undulation of the road surface may be absorbed by the damping force generated by the orifices 22V and the pressure accumulated in the pressure accumulators 22P. On the other hand, relatively low frequency component of the road shock may also be absorbed by motion of the valve spools 19 of the pressure control valve.

Assuming right-hand steering operation is made, lateral acceleration may be exerted on the vehicle body due to centrifugal force. In this case, the lateral force is directed in leftward to cause vehicular rolling in counterclockwise direction to lower the left side and to rise the right side. The lateral acceleration sensor 110 detects the lateral acceleration exerted on the vehicle body to output the positive value of lateral acceleration indicative signal Gy. At the same time, each of the FL and RL vertical acceleration sensors 114FL and 114RL outputs negative value of FL and RL acceleration indicative signal $Gz_{FL}$ and $Gz_{RL}$. On the other hand, each of the FR and RR vertical acceleration sensors 114RL and 114RR outputs positive value of FR and RR vertical acceleration indicative signal $Gz_{FR}$ and $Gz_{RR}$. Since the FL and RL vertical acceleration sensors 114FL and 114RL are connected to the rolling acceleration deriving circuits 115F and 115R via the inverting input terminals, the rolling acceleration indicative signal values to be output from the rolling acceleration deriving circuits 115F and 115R becomes positive value as a function of the sum values. Based on the rolling acceleration indicative signals $GF_{roll}$ and $GR_{roll}$ output from the rolling acceleration deriving circuits 115F and 115R, the integrators 122F and 122R derives the rolling velocity indicative signals $\phi_F$ and $\phi_R$ Based on the lateral acceleration indicative signal Gy and the rolling velocity indicative signals $\phi_F$ and $\phi_R$, suspension control signals $S_{FL}$, $S_{FR}$, $S_{RL}$ and $S_{RR}$ are derived for controlling the pressure control valves 18.

Since the lateral acceleration monitored by the lateral acceleration sensor 110 contains a component indicative of lateral acceleration actually exerted on the vehicle body and a component generated by rolling motion of the vehicle body. The latter component contained in the lateral acceleration indicative signal serves for causing self-induced vibration. In order to cancel the self-induced vibration creating component, the rolling velocity indicative signals $\phi_F$ and $\phi_R$ are added to the lateral acceleration dependent suspension control signal Sy with a phase shift of 90°. This successfully avoid the self-induced vibration creating component.

Similarly, when left-hand steering operation is made, the self-induced vibration creative component is canceled from the lateral acceleration dependent suspension control signal Sy which is generated on the basis of the lateral acceleration indicative signal of the lateral acceleration sensor.

Here, the fundamental idea of the present invention of rolling suppressive suspension control with avoidance of the self-induced lateral vibration will be discussed with reference to the model shown in FIG. 7. In the shown model, a vehicular body 80 shown as a sprung mass is suspended on a suspension arms 82 which constitute an unsprung mass with the vehicular wheel and suspension assembly. The lateral acceleration sensor 110 is mounted in an appropriate position on the vehicle body. The vertical acceleration sensors 114L and 114R are mounted at the top of their respective suspension assemblies. The lateral component of rolling energy which causing rolling motion of the vehicle is thus monitored by the lateral acceleration sensor 110. On the other hand, the vertical component of the rolling energy is monitored by the vertical acceleration sensors 114L and 114R. The lateral acceleration indicative signal of the lateral acceleration sensor 110, which is representative of the lateral component of the rolling energy, is amplified by a roll control gain Ky. On the other hand, the vertical acceleration indicative values of the vertical acceleration sensors 114L and 114R, which represents the vertical component of the rolling energy, are amplified with a bounding control gains $K_3$. The amplified lateral acceleration indicative signal and the vertical acceleration indicative signals are added to derive roll suppressive suspension control signals $S_L$ and $S_R$. The value of the rolling suppressive control signals $S_L$ and $S_R$ are fed to hydraulic system H(s), i.e. the actuator 22.

Figure 7:
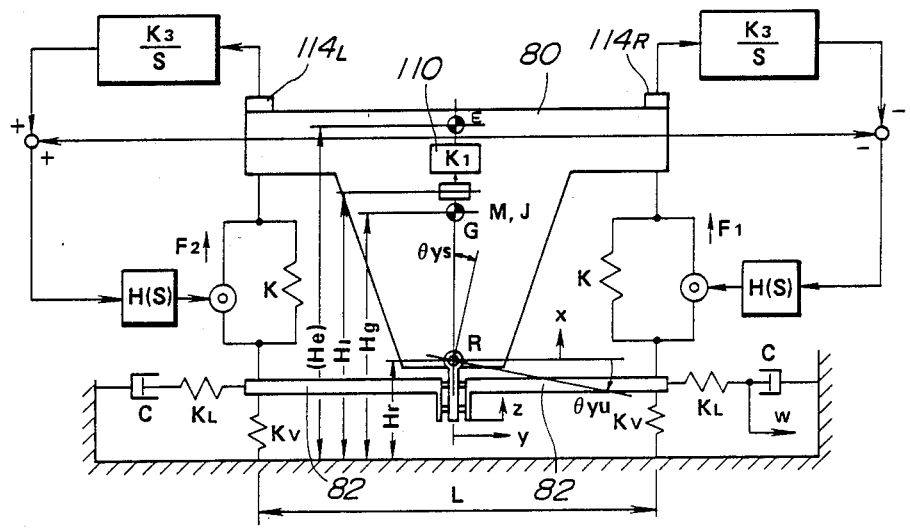
FIG. 7 is an illustration showing a model to be utilized for discussion about logic of anti-roll suspension control.

It is assumed that the condition of the model of FIG. 7 are as follows:

[SPECIFICATION]

M is a weight of sprung mass;
J is a rolling inertia moment;
K is a spring coefficient of suspension;
L is a treat;
Hr is a roll center height;
$H_9$ is a gravity center height
$K_L$ is a lateral strength of tire;
$K_y$ is a vertical strength of tire;
C is an equivalent absorption of cornering power of tire, which equivalent absorption represents cornering force of the tire and thus is variable depending upon the vehicle speed;

[CONSTANT]

$H_1$ is a height of the lateral acceleration sensor;

[VARIABLES]

$\theta_{ys}$ is a roll angle of the sprung mass;
$\theta_{yu}$ is a roll angle of the unsprung mass;
x is a vertical displacement of the sprung mass;
y is a lateral displacement of the sprung mass;
z is a vertical displacement of the unsprung mass;
w is a displacement of traction point.

In the aforementioned arrangement, when lateral acceleration is generated on the vehicle body to cause vehicular rolling due to centrifugal force, this rolling motion creates additional acceleration to be monitored by the lateral acceleration sensor. The rolling velocity dependent suspension control signal has a value substantially corresponding to the self-induced vibration creative component as monitored by the lateral acceleration sensor. Therefore, by adding the rolling velocity dependent suspension control signal to the lateral acceleration dependent suspension control signal, the self-induced vibration creative component can be canceled. Therefore, the self-induced vibration can be successfully avoided.

Since the embodiment shown successfully cancel the self-induced vibration creative component from the lateral acceleration indicative signal to avoid the possibility of the self-induced vibration, higher response characteristics can be provided in the rolling suppressive suspension control system. By providing higher response characteristics, suppression of vehicular rolling becomes satisfactory.

Though the discussion given hereabove is concentrated in the area of roll suppressive suspension control, the similar logic is applicable for suppression of pitching and/or yawing of the vehicle.

Figure 8:
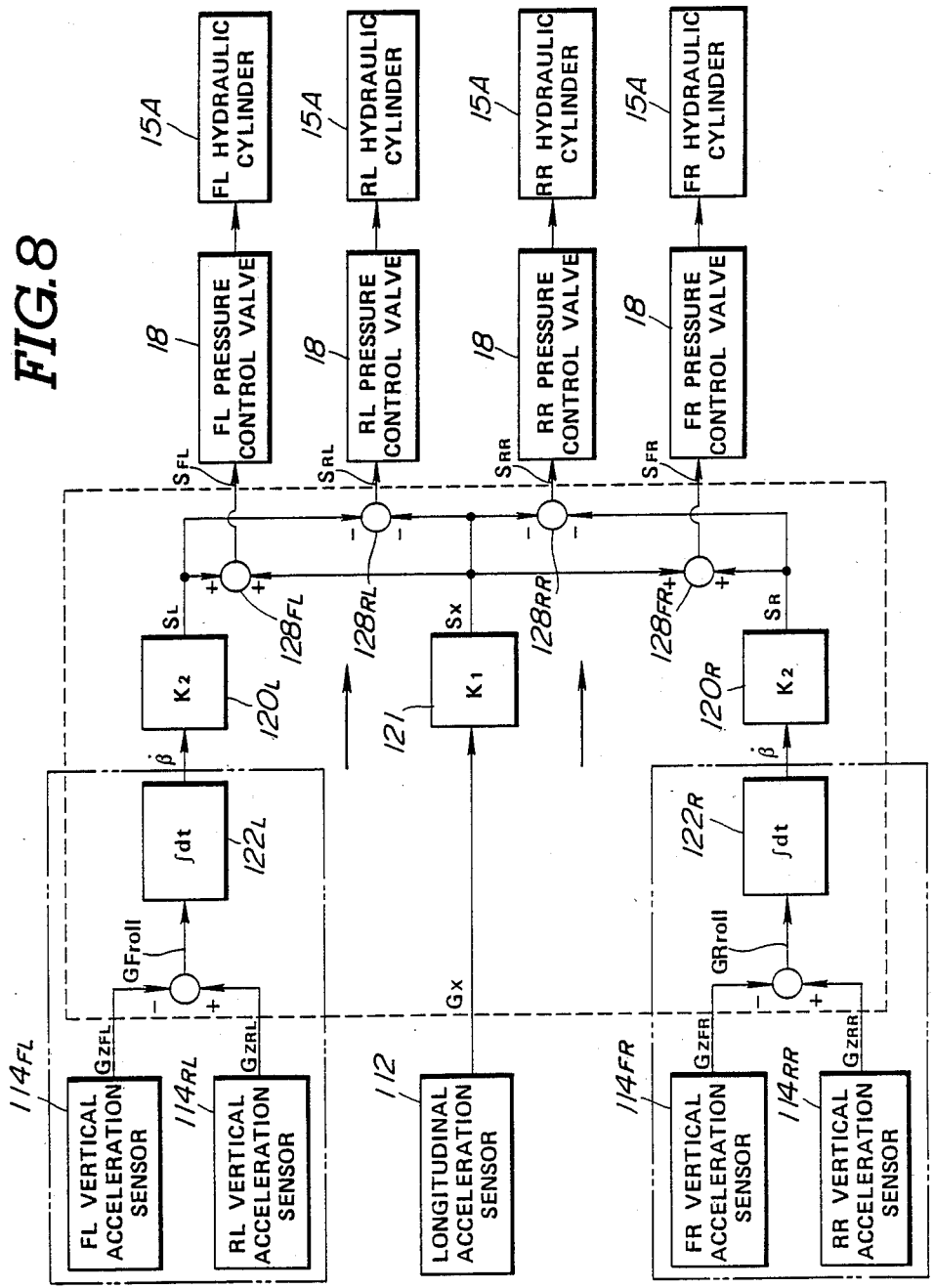
FIG. 8 is a schematic block diagram of the preferred embodiment of suspension control system of FIG. 1.

FIG. 8 shows the preferred embodiment of the pitching suppressive suspension control system according to the invention. In order to pitching suppressive control, the control system employs a longitudinal acceleration sensor 112 which monitors vehicular longitudinal acceleration and produces a longitudinal acceleration indicative signal Gx, in place of the lateral acceleration sensor in the former embodiment.

The FL vertical acceleration sensor 114FL and RL vertical acceleration sensor 114RL are coupled for detecting left-side pitching velocity. On the other hand, the FR vertical acceleration sensor 114FR and the RR vertical acceleration sensor 114RR are coupled for detecting right-side pitching velocity. Namely, the FL vertical acceleration sensor 114FL and the RL vertical acceleration sensor 114RL are connected to a left-side pitching acceleration deriving circuit 115L. The left-side pitching acceleration deriving circuit 115L derives the difference of the FL vertical acceleration indicative signal $Gz_{FL}$ and the RL vertical acceleration indicative signal $Gz_{RL}$ and further derives the left-side vertical acceleration $GL_{pitch}$ on the bases of the derived difference and the span between the front-left and rear-left wheel axles. Similarly, the FR vertical acceleration sensor 114FR and the RR vertical acceleration sensor 114RR are connected to a left-side pitching acceleration deriving circuit 115R. The left-side pitching acceleration deriving circuit 115R derives the difference of the FR vertical indicative signal $Gz_{FR}$ and the RR vertical acceleration indicative signal $Gz_{RR}$ and further derives the right-side vertical acceleration $GR_{pitch}$ on the bases of the derived difference and the span between the front-right and rear-right wheel axles. The left-side and right-side vertical acceleration indicative signals $GL_{pitch}$ and $GR_{pitch}$ are fed respectively to amplifiers 120L and 120R. The amplifiers 120L and 120R are provided given gain $K_2$ to amplify the left-side and right-side vertical acceleration indicative signals $GL_{pitch}$ and $GR_{pitch}$ to output pitching velocity dependent suspension control signals $S_L$ and $S_R$ On the other hand, adders 128FL and 128FR are connected to the amplifiers 120L and 120R via non-inverting input terminals, and the adders 128RL and 128RR are connected to the amplifiers 120L and 120R via inverting input terminals. The other non-inverting input terminals of the adders 128FL and 128FR and inverting input terminals of the adders 128RL and 128RR are connected to an amplifier 121 which is designed to amplify the longitudinal acceleration indicative signal Gx and is provided a given gain $K_1$, to receive therefrom a pitching acceleration dependent suspension control signal Sx. In the adders 128FL, 128FR, 128RL and 128RR, the pirching acceleration dependent suspension control signal Sx is modified by the pitching velocity dependent suspension control signals $S_L$ and $S_R$ from the amplifiers 120L and 120R.

Similarly to the foregoing embodiment, the pitching velocity dependent suspension control signals $S_L$ and $S_R$ serve for canceling the self-induced pitching creative component from the longitudinal acceleration indicative signal, which self-induced pitching creative component is generated by vehicular pitching motion.

Therefore, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims. Namely, though the discussion given hereabove is directed to hydraulic cylinder and hydraulic circuit for producing damping force for controlling suspension characteristics in the actively controlled suspension system according to the invention, it should be possible to apply the same logic in roll-suppressive and/or pitching suppressive suspension control for hydropneumatic suspension, pnueumatic suspension and so forth. Furthermore, though the shown embodiment discloses the suspension control system which perform both of roll-suppressive and pitching-suppressive control, it is construct the suspension system to perform only roll-suppressive control.

What is claimed is:

1. A control system for an automotive suspension system for controlling vehicular attitude comprising:
   said suspension system disposed between a vehicle body and a suspension member which rotatably supports a vehicular wheel, said suspension system having a variable pressure chamber filled with a working fluid of controlled pressure;
   a pressure adjusting means, associated with said variable pressure chamber, for adjusting the pressure of said working fluid in said pressure chamber;
   a first sensor means sensing acceleration in vehicular attitude change to produce a first sensor means signal indicative of said attitude change acceleration;
   a second sensor means sensing an attitude change creative component which is contained in said first sensor means signal, to produce a second sensor means signal indicative thereof;
   a control unit receiving said first and second sensor means signals, deriving a suspension control second value on the basis of said first sensor means signal and modifying said suspension control signal value on the basis of said second sensor means signal, said control unit outputting a control signal based at least on said modified suspension control signal value to control said pressure adjusting means for adjusting suspension characteristics to suppress said vehicular attitude change.

2. A control system as set forth in claim 1, wherein said second sensor means senses the vehicular attitude change for deriving said attitude change creative component based thereon.

3. A control system as set forth in claim 1, wherein said first sensor means includes means for sensing response characteristics of suspension control in response to said attitude change acceleration and said second sensor means includes means for sensing response characteristics of suspension control in response to said attitude change creative component.

4. A control system as set forth in claim 3, wherein each of said response characteristics sensing means of said first and second sensor means comprises an amplifier provided with a given gain which determines said response characteristics.

5. A control system as set forth in claim 1, which is designed to perform anti-rolling suspension control for suppressing rolling motion of the vehicle, and said first sensor means is designed to sense lateral acceleration for producing lateral acceleration indicative first sensor signal and said second sensor means is designed to sense rolling velocity for producing a rolling velocity indicative second sensor signal.

6. A control system as set forth in claim 1, which is designed to perform anti-pitching suspension control for suppressing pitching motion of the vehicle, and said first sensor means is designed to sense longitudinal acceleration for producing longitudinal acceleration indicative first sensor signal and said second sensor means is designed to sense pitching velocity for producing a pitching velocity indicative second sensor signal.

7. A control system as set forth in claim 1, wherein said pressure adjusting means comprises a pressurized fluid source connected to said variable pressure chamber and a pressure control valve incorporating an electrically operable actuator, said actuator being connected to said control unit to receive said control signal to operate said pressure control valve for adjusting the amount of working fluid to be introduced into and removed from said variable pressure chamber for adjusting damping characteristics of said suspension system.

8. A control system as set forth in claim 7, wherein said second sensor means senses the vechicular attitude change for deriving said attitude change creative component based thereon.

9. A control system as set forth in claim 7, wherein said first sensor means includes means for sensing response characteristics of suspension control in response to said attitude change acceleration and said second sensor means includes means for sensing response characteristics of suspension control in response to said attitude change creative component.

10. A control system as set forth in claim 9, wherein each of said response characteristics sensing means of said first and second sensor means comprises an amplifier provided with a given gain which determines said response characteristics.

11. A control system as set forth in claim 7, which is designed to perform anti-rolling suspension control for suppressing rolling motion of the vehicle, and said first sensor means is designed to sense lateral acceleration for producing lateral acceleration indicative first sensor signal and said second sensor means is designed to sense rolling velocity for producing a rolling velocity indicative second sensor signal.

12. A control system as set forth in claim 7, which is designed to perform anti-pitching suspension control for suppressing pitching motion of the vehicle, and said first sensor means is designed to sense longitudinal acceleration for producing longitudinal acceleration indicative first sensor signal and said second sensor means is designed to sense pitching velocity for producing a pitching velocity indicative second sensor signal.

13. A control system for an automotive suspension system for controlling vehicular attitude comprising:
   said suspension system disposed between a vehicle body and a suspension member which rotatably supports a vehicular wheel, said suspension system having a variable pressure chamber filled with a working fluid of controlled pressure;
   a pressure adjusting means, associated with said variable pressure chamber, for adjusting the pressure of said working fluid in said pressure chamber;
   a first sensor means sensing acceleration in vehicular rolling to produce a first sensor means signal indicative of said rolling acceleration;
   a second sensor means sensing a rolling creative component which is contained in said first sensor means signal, to produce a second sensor means signal indicative thereof;
   a control unit receiving said first and second sensor means signals, deriving a suspension control signal value on the basis of said first sensor means signal and modifying said suspension control signal value on the basis of said second sensor means signal, said control unit outputting a control signal based at least on said modified suspension control signal value to control said pressure adjusting means for adjusting suspension characteristics to suppress said vehicular rolling.

14. A control system as set forth in claim 13, wherein said second sensor means senses the vehicular rolling for deriving said rolling creative component based thereon.

15. A control system as set forth in claim 13, wherein said first sensor means includes means for sensing response characteristics of suspension control in controlling response to said rolling acceleration and said second sensor means includes means for sensing response characteristics of suspension control in response to said rolling creative component.

16. A control system as set forth in claim 15, wherein each of said response characteristics sensing means of said first and second sensor means comprises an amplifier provided with a given gain which determines said response characteristics.

17. A control system as set forth in claim 15, wherein said pressure adjusting means comprises a pressurized fluid source connected to said variable pressure chamber and a pressure control valve incorporating an electrically operable actuator, said actuator being connected to said control unit to receive said control signal to operate said pressure control valve for adjusting amount of working fluid to be introduced into and removed from said variable pressure chamber for adjusting damping characteristics of said suspension system.

18. A control system for an automotive suspension system for controlling vehicular attitude comprising:
    said suspension system disposed between a vehicular body and a suspension member which rotatably supports a vehicular wheel, said suspension system having a variable pressure chamber filled with a working fluid of controlled pressure;
    a pressure adjusting means, associated with said variable pressure chamber, for adjusting the pressure of said working fluid in said pressure chamber;
    a first sensor means sensing acceleration in vehicular pitching to produce a first sensor means signal indicative of said pitching acceleration;
    a second sensor means sensing a pitching creative component which is contained in said first sensor means signal, to produce a second sensor means signal indicative thereof;
    a control unit receiving said first and second sensor means signals, deriving a suspension control signal value on the basis of said first sensor means signal and modifying said suspension control signal value on the basis of said second sensor means signal, said control unit outputting a control signal based at least on said modified suspension control signal value to control said pressure adjusting means for adjusting suspension characteristics to suppress said vehicular pitching.

19. A control system as set forth in claim 18, wherein said second sensor means senses the vehicular pitching for deriving said pitching creative component based thereon.

20. A control system as set forth in claim 18, wherein said first sensor means includes means for sensing response characteristics of suspension control in response to said pitching acceleration and said second sensor means includes means for sensing response characteristics of suspension control in response to said pitching creative component.

21. A control system as set forth in claim 20, wherein each of said response characteristics sensing means of said first and second sensor means comprises an amplifier provided with a given gain which determines said response characteristics.

22. A control system as set forth in claim 18, which is designed to perform anti-pitching suspension control for suppressing pitching motion of the vehicle, and said first sensor means is designed to sense lateral acceleration for producing lateral acceleration indicative first sensor signal and said second sensor means is designed to sense the vehicular pitching for producing a pitching indicative second sensor signal.

23. A control system as set forth in claim 21, wherein said pressure adjusting means comprises a pressurized fluid source connected to said variable pressure chamber and a pressure control valve incorporating an electrically operable actuator, said actuator being connected to said control unit to receive said control signal to operate said pressure control valve for adjusting amount of working fluid to be introduced into and removed from said variable pressure chamber for adjusting damping characteristics of said suspension system.

* * * * *